United States Patent
Zoell et al.

(10) Patent No.: US 6,413,462 B1
(45) Date of Patent: Jul. 2, 2002

(54) METHOD OF PROTECTING CABLE STRANDS

(75) Inventors: Jürgen Zoell, Heringen-Herta; Raif Muehlhausen, Rotenburg, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/743,555

(22) PCT Filed: May 5, 2000

(86) PCT No.: PCT/EP00/04027
§ 371 (c)(1),
(2), (4) Date: Apr. 18, 2001

(87) PCT Pub. No.: WO00/69032
PCT Pub. Date: Nov. 16, 2000

(30) Foreign Application Priority Data
May 11, 1999 (DE) .......... 199 21 540

(51) Int. Cl.[7] .......... B29C 45/14; B29C 70/70; B29C 70/72; B29C 70/88
(52) U.S. Cl. .......... 264/263; 264/271.1; 29/883
(58) Field of Search .......... 264/271.1, 272.11, 264/263, 277; 29/883, 884

(56) References Cited

U.S. PATENT DOCUMENTS

| | | | |
|---|---|---|---|
| 4,460,159 A | * 7/1984 | Charlebois et al. | 264/263 |
| 4,490,315 A | * 12/1984 | Charlebois et al. | 264/272.11 |
| 4,821,413 A | * 4/1989 | Schmitt et al. | 264/272.11 |
| 4,851,611 A | * 7/1989 | De Concini et al. | 174/52.3 |
| 5,476,396 A | * 12/1995 | De Castro | 439/692 |
| 5,560,879 A | * 10/1996 | Tanigawa | 264/263 |
| H1650 H | * 6/1997 | Olson | 29/868 |
| 6,074,591 A | * 6/2000 | Privett | 264/278 |

* cited by examiner

Primary Examiner—Angela Ortiz
(74) Attorney, Agent, or Firm—Richard A. Speer; Mayer, Brown, Rowe & Maw

(57) ABSTRACT

Stranded cable conductors, especially their connecting joints with electrical components, are damaged during use in aggressive surroundings, for example in fuels. Protective measures, such as shrinkable tubes or protective coatings, do not ensure adequate protection however. With the novel process, stranded cable conductors and their connecting joints with electrical components are to be protected against the attack of aggressive media. With the process according to the invention, stranded cable conductors are encapsulated in a fuel-resistant plastic, the encapsulation not covering the entire length of the stranded cable conductor but the region which is exposed to aggressive media. The process does not require any pretreatment of the stranded cable conductors.

7 Claims, 1 Drawing Sheet

METHOD OF PROTECTING CABLE STRANDS

BACKGROUND OF THE INVENTION

The subject matter of the invention is a process for protecting stranded cable conductors in aggressive surroundings. Stranded cable conductors, which comprise a plurality of individual metal wires braided or twisted with one another, are often used as electrical lines for connecting electrical components.

Many electrical components are nowadays arranged in aggressive surroundings. For example, in motor vehicles fuel pumps for delivering fuel are used directly in fuel tanks. During the operation of the fuel pump, the fuel also flows through the electric motor driving the pump, for cooling purposes. Consequently, fuel also washes around the connecting joints of the electric motor with the electrical lines that are present. These connecting joints are attacked by aggressive constituents in fuels in such a way that the connecting joints are damaged and the component ultimately fails. However, it is not only the constituents contained in fuels that lead to damage. Similarly, moisture, dirt or rainwater can lead to stranded cable conductors being damaged at other points.

It is known in this respect to surround stranded cable conductors with insulating sheathings. What is disadvantageous about sheathings of this kind is that, when the stranded cable conductors are connected to a component, this sheathing has to be removed and the connecting joint is subsequently exposed. For protecting the connecting joints, it is known to provide them with a protective coating. The disadvantage of protective coatings that are used is that they are not resistant to all aggressive media, especially ethanol, which is a constituent of some fuels. What is more, the use of protective coatings is disadvantageous from ecological aspects.

It is known furthermore to insulate stranded cable conductors with shrinkable tubes, in that a tube of an appropriate plastic is shrunk on under the effect of heat. In addition to insulation, shrinkable tubes do indeed also offer a certain protection against aggressive media. However, the connection between the shrinkable tube and the stranded cable conductor is never impermeable enough for penetration of the aggressive media between the stranded cable conductor and the shrinkable tube to be reliably prevented, so that damage to the stranded cable conductor is not ruled out. Furthermore, in particular in the case of small components, the assembly of stranded cable conductors insulated in this way entails difficulties on account of the elasticity of the shrinkable tube. A further disadvantage is that shrinkable tubes cannot be used unrestrictedly. For instance, a shrinkable tube can only be used for protection of a connecting joint between a stranded cable conductor and an electrical component if the component and the stranded cable conductor have approximately the same dimensions with regard to the diameter.

BRIEF SUMMARY OF THE INVENTION

The invention is based on the object of providing a process for protecting stranded cable conductors to protect them effectively against the attack of aggressive media. The connecting joints between stranded cable conductors and electrical components are especially to be protected by the process. The object is achieved by the features of claim 1. Further advantageous developments are described in the subclaims.

It has been found that stranded cable conductors can be effectively protected in aggressive surroundings by being partially encapsulated in a fuel-resistant plastic. This means that the stranded cable conductor is not encapsulated over its entire length but only in the region in which the stranded cable conductor is exposed to aggressive media.

This is all the more surprising since prevailing opinion assumes that the plastic under high pressure during injection molding will penetrate between the wires of the stranded cable conductor and, after hardening, form sharp edges in the outer region of the encapsulation in particular. If the stranded cable conductor is then subjected to movements, as occur for example in a motor vehicle, these movements may lead to the individual wires being severed at the edges. As a consequence, the stranded cable conductor may break and the electrical component may ultimately fail.

However, with the process according to the invention, the feared penetration of the plastic between the wires of the stranded cable conductor does not occur, so that from now on stranded cable conductors may also have partial encapsulations of plastic without the risk of the stranded cable conductor being damaged at the edges of the plastic in which it is encapsulated when there are movements.

The great advantage is that encapsulations can be produced in a wide variety of forms. The protection against aggressive media is consequently no longer restricted exclusively to the simple form of the stranded cable conductor. Rather, complicated geometries can also be encapsulated, so that from now on the connecting joints of the stranded cable conductor and the electrical component in particular are effectively protected against attack by aggressive media and the stranded cable conductor does not need any prior treatment.

Nevertheless, production defects or previous assembly may have the effect that the stranded cable conductor no longer has the necessary impermeability. In these cases, it is advantageous for the stranded cable conductor to be mechanically compressed in the outer region of the encapsulation. As a result, the penetration of plastic into the stranded cable conductor is prevented.

In another advantageous development of the process, before being encapsulated in plastic, the stranded cable conductor is surrounded in the region of the ends of the encapsulation with a thin sleeve of a fuel-resistant metal. This sleeve prevents penetration of the plastic even more reliably during encapsulation of the stranded cable conductor. At the same time, the pressure during the process ensures the necessary sealing between the stranded cable conductor and the sleeve, so that no fuel can penetrate between the sleeve and the stranded cable conductor.

In other applications, in which two components are electrically connected to a stranded cable conductor, it may happen that the components are already adequately protected and only the stranded cable conductor is in an area with aggressive media. In such cases, the process according to the invention can likewise be used for providing the stranded cable conductor with the partial encapsulation, here again the encapsulation being restricted to the region at risk.

In a further advantageous development of the invention, in which the electrical component is arranged in a housing and the stranded cable conductor is led out of the housing, the partial encapsulation of the stranded cable conductor serves at the same time as a seal between the stranded cable conductor and the housing.

In another advantageous development of the process, polyoxymethylene (POM) or PPS is used as the plastic. The use of these fuels [sic] has the advantage that these plastics is [sic] resistant not only to fuel but also to other aggressive media.

A further advantage is that, by suitable choice of the wall thickness of the plastic, the mobility of the stranded cable conductor can be specifically set. Even with small wall thicknesses, the mobility is restricted to the extent that, on account of the mechanical rigidity, the stranded cable conductor is self-supporting in this region. Similarly, the encapsulation of the stranded cable conductor may enforce a certain form, which corresponds to the stranded cable conductor in the assembled state. As a result, assembly can be simplified significantly.

DESCRIPTION OF THE DRAWING

The invention is explained in more detail on the basis of an exemplary embodiment. The single FIGURE shows a plug-in contact with a portion of a stranded cable conductor.

DETAILED DESCRIPTION OF THE INVENTION

Figure 1:
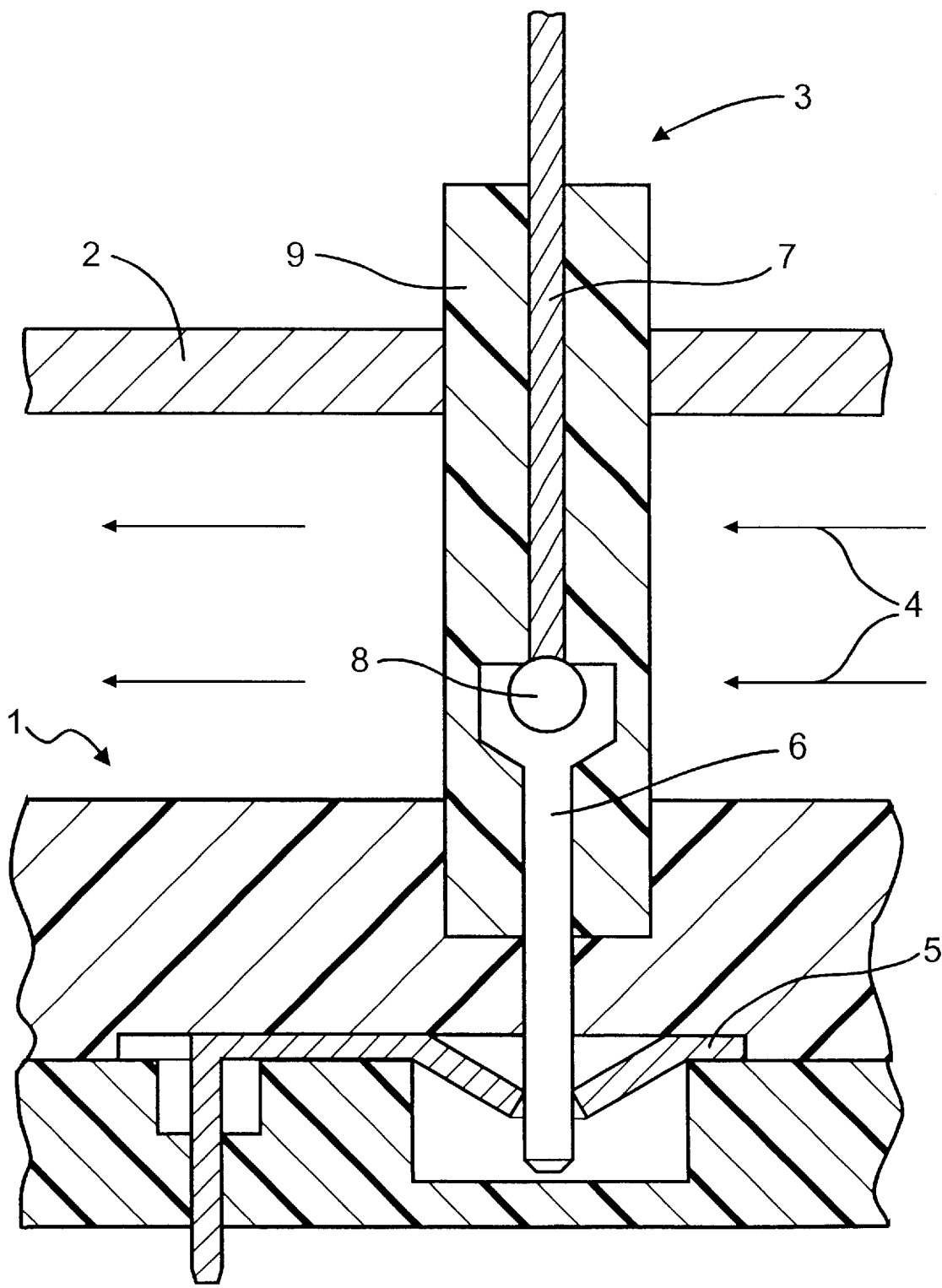

Represented in the figure is a motor plug 1 of an electric motor (not represented) of a fuel pump, which motor is arranged in a fuel pump housing 2, and an electrical line 3 for supplying power to the electric motor. The fuel 4 delivered by the fuel pump flows in the region between the plug 1 in the electric motor and the housing 2. The motor has a contact plate 5 which receives an electrical motor plug 1 and a contact pin 6 that extends outwardly into the fuel flow region between the electric motor and the housing 2. A bare stranded cable conductor 7 is joined to contact pin 5 at connecting joint 8 by welding it to the end of the pin opposite the end that is received into contact plate 5.

Stranded cable conductors (such as conductor 7) are, as is well known, constructed of a plurality of individual strands in which a selected number of the individual strands are twisted together about the longitudinal axis of the strands to form a single cable. Each strand has a circular cross-section so that the strands are in contact with each other only along a line at each end of a diameter of each strand. Thus, the outer surface of the cable is defined by the outer hemicylindrical surfaces of the strands constituting the cable. Internally, the cable contains longitudinally extending spiral voids between the strands, due to the above-mentioned line contact between the individual strands. The diameter of the cable is usually the sum of the diameters of the individual strands as measured along the diameter of the cable.

To protect the connecting joint 8 between the stranded cable conductor 7 and contact pin 6 from the corrosive effects of fuel 4, that portion of the bare, stranded cable conductor 7 that is located within the fuel flow region between housing 2 and the motor, is shown as encapsulated in a plastic which is immune to the corrosive effects of automotive fuels. Suitable plastics for use in this environment are polyoxymethylene (POM) and polyphenylsulfide (PPS). These compositions do not adversely penetrate between the individual strands of cable 7 and thereby create sharp edges that could cause wire severance. Additionally, the PPS and POM plastics are resistant to the corrosive effects of motor vehicle fuels so that the base conductor 7 and the connecting joint 8 are, after encapsulation, protected from the fuel. Other plastics such as "Surlyn," a copolymer of ethylene, as well as polyethylene, polypropylene and polystyrene are not adequately resistant to the corrosive effects of auto fuels to be of use in the present invention. At the same time, the POM or PPS encapsulation 9 serves as a seal for the stranded cable conductor 7 led through the housing 2 of the fuel pump. Additional protection of the connecting joint 8 and the length of bare cable that is to be encapsulated can be obtained by exerting radially directed compression forces against the cable, as mentioned earlier in the specification. Such compression causes a compaction of the cable by reducing the size of the internal voids between the cable strands. Additionally, the hemicylindrical outer surfaces of the strands are flattened and the contact between contacting strands becomes planar rather than linear. Compression of the cable thus results in some reduction of the diameter of the selected length of cable. Also, as set out above, further advantages are obtainable by providing a sleeve that is placed over the connecting joint 8 and the length of bare cable located within the flow region prior to the time of encapsulation. The sleeve, made advantageously of a metal inert to the corrosive effects of vehicle fuel, is secured tightly in position by the encapsulation pressure.

The method for making the structure shown in FIG. 1, the method being the subject mater of the invention, is as follows. The first step is the provision of an automotive vehicle fuel pump that has a surrounding housing 2 and an electric motor located within that housing. Secondly, an electrical connecting pin 6 is provided that extends from the electric motor into the space or region between the electric motor and housing 2, through which fuel flows. A length of bare, stranded electrical cable is then inserted through the fuel pump housing 2 and joined, as by welding, soldering or the like, to the electrical connecting pin 6. After connection between cable 7 and pin 6 provides continuity between a source of electricity and the fuel pump motor, the bare length of cable within the fuel flow region between housing 2 and the electric motor are placed into an injection mold and encapsulated with either POM or PPS plastic. As shown in FIG. 1, an additional length of bare cable outside of the fuel flow region is also encapsulated.

The preceding method can be modified by compressing the end of the cable 7 that is joined to pin 6 for some preselected length, prior to its joining to pin 6, for reasons previously described. An additional modification to the method is the step of placing a protective film or sleeve about the end of the cable and the connective joint to be protected prior to encapsulation, so that the pressure of encapsulation will ensure tight contact between the cable and the sleeve.

What is claimed is:

1. A method for making an electrical connection between an end of a multi-strand bare metal electrical cable conductor and an electrical contact pin that extends from the electric motor of a motor vehicle fuel pump into a region between the motor and a surrounding fuel pump housing, through which vehicle fuel flows, comprising the steps of:

(a) providing a vehicle fuel pump having a surrounding housing;

(b) providing an electric motor within the fuel pump housing whereby a region through which fuel flows exists between the motor and the fuel pump housing;

(c) providing an electrical connecting pin connected to the electric motor which extends into the flow region between the motor and the fuel pump housing;

(d) inserting a length of the bare electrical conductor through the fuel pump housing into the flow region and joining the end thereof to the electrical connecting pin on the motor; and (e) placing the length of the bare electrical conductor and the connecting pin located within the flow region into an injection mold and encapsulating the cable and pin with a material selected from the group consisting of polyoxymethylene and polyphenylensulfide.

2. A method as described in claim 1 wherein at least the length of the bare electrical conductor located within the flow region is mechanically compressed prior to its joining to the connecting pin to radially compact the strands and thereby reduce the diameter of the conductor.

3. A method as defined in claim 1 wherein at least the length of the bare electrical conductor located within the flow region is enclosed within a sleeve of fuel resistant metal prior to its joining to the connecting pin.

4. The process as claimed in claim 1, wherein a fuel-resistant metal is used as the sleeve.

5. The process as claimed in claim 1, wherein the mobility of the stranded cable conductor is specifically set by choice of the wall thickness of the encapsulation.

6. The process as claimed in claim 1, wherein the stranded cable conductor is encapsulated in such a way that, after being encapsulated, it has the form of its later installation position.

7. The process as claimed in claim 1, wherein a polyoxymethylene or a PPS is used as the plastic.

* * * * *